United States Patent [19]

Homberg et al.

[11] 3,864,378

[45] Feb. 4, 1975

[54] PROCESS FOR PREPARING 2-HYDROXYETHYLIMINODIACETONITRILE

[75] Inventors: Otto A. Homberg, Easton; Carl E. Fries, Jr., Northhampton, both of Pa.

[73] Assignee: Bethlehem Steel Corporation, Bethlehem, Pa.

[22] Filed: Feb. 5, 1973

[21] Appl. No.: 329,803

[52] U.S. Cl. ............... 260/465.5 A, 260/534 M
[51] Int. Cl. .................. C07c 121/02, C07c 121/42
[58] Field of Search ................. 260/465.5 A

[56] References Cited
UNITED STATES PATENTS

| | | | |
|---|---|---|---|
| 2,589,208 | 3/1952 | Craig | 260/465.5 A |
| 2,855,428 | 10/1958 | Singer et al. | 260/465.5 A |
| 3,167,580 | 1/1965 | Saunders et al. | 260/465.5 A |

OTHER PUBLICATIONS

Wagner & Zook, "Synthetic Organic Chemistry," 1953, page 412.

*Primary Examiner*—Joseph Paul Brust
*Attorney, Agent, or Firm*—Joseph J. O'Keefe; Charles A. Wilkinson

[57] ABSTRACT

2-Hydroxyethyliminodiacetonitrile is prepared from monoethanolamine, formaldehyde and hydrogen cyanide at pH 7-9. Hydrolysis of the nitrile in an aqueous solution, after removal of any excess cyanide and formaldehyde, results in the formation of 2-hydroxyethyliminodiacetic acid, or corresponding salt, free from contamination. 2-hydroxyethyliminodiacetates are useful as detergent builders.

10 Claims, No Drawings

PROCESS FOR PREPARING 2-HYDROXYETHYLIMINODIACETONITRILE

BACKGROUND OF THE INVENTION

The general synthesis of α-amino nitriles and their consequent hydrolysis product, α-amino acids, is well known. The process, in which hydrogen cyanide is added to a carbonyl double bond in the presence of ammonia, is associated with Strecker, who first performed the general synthesis in the 1850's.

In recent years the Strecker synthesis has been widely practiced in the manufacture of nitrilotriacetic acid (NTA) and its sodium salt, SNTA. Because of the importance of SNTA as a detergent builder, the patent literature is replete with disclosures directed to SNTA manufacture. The multiplicity of issued patents directed to the subject testify to the difficulty involved in SNTA manufacture despite the over one hundred years since the discovery of the Strecker synthesis.

At the present time, the state of the art with regard to the Strecker synthesis (as it applies to SNTA chemistry) now recognizes that, in general, the control of the pH of the reaction is determinative of the final product. For example, when ammonia is used as the reacting amine and formaldehyde as the reacting carbonyl group, the effect of pH upon the progress of the reaction is as follows:

a. Under essentially neutral conditions monocyanomethylation occurs according to the equation:
   1. $2\ HCHO + HCN + NH_3 \longrightarrow CH_2=NCH_2CN + 2\ H_2O$ forming N-methyleneaminoacetonitrile. (Gilman & Blatt, Organic Synthesis, Col. Vol. I, p. 355).

b. at a pH of 5 iminodiacetonitrile is isolated:
   2. $2\ HCHO + 2\ HCN + NH_3 \longrightarrow HN(CH_2CN)_2$
   (U.S. Pat. No. 3,153,688, Sexton; U.S. Pat. No. 2,511,487, Thompson; U.S. Pat. No. 2,794,044, Miller).

c. at pH's of about 4 methylene bis(aminodiacetonitrile) is the product:
   3. $5\ HCHO + 4\ HCN + 2\ NH_3 \longrightarrow (NCCH_2)_2NCH_2N(CH_2CN)_2$ (Reference: Ger. Pat. No. 1,159,959, Koenig)

d. at pH's of less than 3 and usually less than 1.5, nitrilotriacetonitrile results:
   4. $3\ HCHO + 3\ HCN + NH_3 \longrightarrow N(CH_2CN)_3$ (U.S. Pat. No. 3,412,137, Stutts; U.S. Pat. No. 2,855,428, Singer).

The effects of pH on degree substitution is so dominant in the Strecker reaction, that in at least one reference which disclosed an incorrect pH for the product sought, the reaction was forced only by using eight times the required starting material. (U.S. Pat. No. 3,167,580, Saunders).

The relationship of product to pH in the Strecker synthesis can thus be expressed as a general premise, that, the lower the pH, the greater the degree of substitution of the amine.

The effect of lowering pH to increase the degree of substitution of amines in the Strecker synthesis holds true where amines other than ammonia are employed. For example, Harper in U.S. Pat. No. 3,424,783, discloses that polycyanomethylation occurs under strongly acid conditions using both primary and secondary amines, an analogy to the SNTA reaction of equation (4).

An alternate route to the Strecker synthesis which utilizes a cyanide salt, such as sodium cyanide instead of hydrogen cyanide is also known. This reaction, which is utilized in SNTA chemistry, follows the equation:

5. $NH_3 + 3\ NaCN + 3\ CH_2O + 3\ H_2O \longrightarrow N(CH_2COONa)_3 + 3\ NH_3$ Reaction (5) goes directly to the acid salt because basic conditions are always present due to the sodium ($Na^+$) ions which provide the necessary reactants for base hydrolysis of the intermediate nitrile:

6. $N(CH_2CN)_3 + 3\ H_2O + 3\ NaOH \longrightarrow N(CH_2COONa)_3 + 3\ NH_3$

The search for detergent builder substitutes with an improvement in properties over SNTA has continued to the present day. Unfortunately, compounds having the combined attributes of improved properties, plus ease of synthesis, are still unknown. One compound which was heretofore known to have improved properties as a detergent builder, but without the necessary ease of synthesis, is sodium 2-hydroxyethyliminodiacetate, $HOCH_2CH_2N(CH_2COONa)_2$ referred to generally as HEIDA. HEIDA as used herein represents, inter alia, the acid, 2-hydroxyethyliminodiacetic acid, or water-soluble salt of the acid. Examples of known salts include sodium, potassium, and ammonium. See, for example, U.S. Pat. Nos. 3,001,945, 3,147,295, 3,322,675, and 3,546,123.

HEIDA, as the soluble salt of the acid, in theory should be produced from monoethanolamine by the Strecker synthesis in accordance with:

7. $HOCH_2CH_2NH_2 + 2\ CH_2O + 2\ HCN \longrightarrow HOCH_2CH_2N(CH_2CN)_2 + 2\ H_2O$ followed by base hydrolysis:

8. $HOCH_2CH_2N(CH_2CN)_2 + 2\ NaOH + 2\ H_2O \longrightarrow HOCH_2CH_2N(CH_2COONa)_2 + 2\ NH_3$ Analogy to the SNTA chemistry would indicate a pH of 4 or 5 for di-substitution of an amine nitrogen.

In fact, heretofore reaction (7) could not be run and as a result HEIDA is commercially produced by an alternate route in which chloroacetic acid, or its sodium salt, and monoethanolamine are reacted according to:

9. $ClCH_2COONa + H_2NCH_2CH_2OH + 2\ NaOH \longrightarrow HOCH_2CH_2N(CH_2COONa)_2 + 2\ NaCl + 2\ H_2O$ Reaction (9) is so economically prohibitive, however, that the use of HEIDA as a detergent builder has been unrealized.

An attempt to produce HEIDA in a reaction similar to the cyanide salt reaction of equation (5) is also known:

10. $HOCH_2CH_2NH_2 + 2\ CH_2O + 2\ NaCN \longrightarrow HOCH_2CH_2N(CH_2CN)_2 + 2\ NaOH$ 11. $HOCH_2CH_2N(CH_2CN)_2 + 2\ NaOH + 2\ H_2O \longrightarrow HOCH_2CH_2N(CH_2COONa)_2 + 2\ NH_3$ (Bull. soc. chim. Belges 67, 167-9 (1958).

However, this reaction leads also to the formation of SNTA as a contaminate of the desired product, HEIDA, in at least 15% yields. On an industrial scale, the cost of separating the SNTA from HEIDA is prohibitive.

There has therefore been a need for a process for the manufacture of HEIDA which is simple, economical and produces a product free of deleterious impurities.

SUMMARY OF THE INVENTION

We have discovered a practical process for the manufacture of HEIDA from monoethanolamine according to the equations:

7. $HOCH_2CH_2NH_2 + 2\ CH_2O + 2\ HCN \longrightarrow HOCH_2CH_2N(CH_2CN)_2 + 2\ H_2O$
8. $HOCH_2CH_2N(CH_2CN)_2 + 2\ MOH + 2\ H_2O \longrightarrow HOCH_2CH_2N(CH_2COOM)_2 + 2\ NH_3$ M = a cation whose base, MOH, is water soluble In regard to equation (7) we have discovered a critical, but unexpected, reaction pH by which 2-hydroxyethyliminodiacetonitrile may be produced from the reaction of monoethanolamine (MEA), formaldehyde, and hydrogen cyanide according to the foregoing equations.

In the invention of this application it is critical that the process illustrated by equation (7) be conducted, not at low pH's, but at pH 7 to pH 9, and preferably pH 8.

Further, we have discovered three essential parameters by which HEIDA may be produced with minimal or no contamination with SNTA.

It is first of all an essential feature of our invention that the neutral to alkaline pH of reaction (7) be obtained, and maintained without the utilization or generation of alkali metal or alkaline earth metal hydroxides during the formation of the 2-hydroxyethyliminodiacetonitrile. Preferably, even though a neutral to alkaline medium is essential, it should be provided by the reactants only.

Secondly, it is an essential feature of our invention that the base hydrolysis of 2-hydroxyethyliminodiacetonitrile to HEIDA according to:

8. $HOCH_2CH_2N(CH_2CN)_2 + 2\ MOH + 2\ H_2O \longrightarrow HOCH_2CH_2N(CH_2COOM)_2 + 2\ NH_3$ M = a cation whose base, MOH, is water soluble
be conducted so that the cyanomethylation of equation (7) and the hydrolysis of equation (8) are never performed concurrently. Thirdly, and as a corollary to the second condition, it is an essential feature of our process that, after the nitrile of equation (7) is formed, the reaction solution be free of excess formaldehyde and cyanide prior to hydrolysis of the 2-hydroxyethyliminodiacetonitrile to HEIDA. Surprisingly, conditions (2) and (3) are preferably, and concurrently, met by utilizing the formaldehyde and cyanide, not in stoichiometric amounts, but in a 30 to 50% excess of equation stoichiometry. Thus, we are able, in the hydrolysis of 2-hydroxyethyliminodiacetonitrile to prevent the formation of SNTA as a contaminate by the reaction:

5. $NH_3 + 3\ NaCN + 3\ CH_2O + 3\ H_2O \longrightarrow N(CH_2COONa)_3 + 3\ NH_3$ because our method prevents the simultaneous occurrence of ammonia, cyanide and formaldehyde in the reaction sequence.

Briefly, the process of this invention contemplates reacting monoethanolamine, formaldehyde and hydrogen cyanide to yield a solution of 2-hydroxyethyliminodiacetonitrile, during which reaction a pH of 7 to 9 is maintained by the reactants only.

After nitrile formation, which is almost instantaneous, the nitrile reaction mixture is treated to remove any remaining cyanide or formaldehyde, if such are present.

Thereafter, the nitrile, still in solution, is treated with a water soluble base (i.e., sodium, potassium or ammonium hydroxide) to hydrolyze the nitrile to the corresponding salt of 2-hydroxyethyliminodiacetic acid.

Alternately, the nitrile solution may be acid hydrolyzed with a strong acid such as hydrochloric acid, or others well known in the art, to form 2-hydroxyethyliminodiacetic acid. The acid may also be formed by treatment of the salt, obtained from base hydrolysis, with a strong acid.

HEIDA, as the acid, is relatively insoluble in aqueous medium and recovery, if desired, may be by precipitation.

The following detailed description includes a first general discussion of the preferred mode, specific detailed exemplary embodiments follow. Also included are variations contemplated within the scope of this invention, all of which will enable any person skilled in the art to practice the method of this invention.

DETAILED DESCRIPTION

All parts herein are by weight, unless otherwise specified. Yields (given in percent) are computed as parts obtained/parts theoretical × 100.

Unless temperatures are set forth, the temperature utilized is ambient.

All illustrative reactions were run with stirring.

A preferred method wherein the yield and assay of HEIDA are maximized, the utilization of reactants is most efficient and the handling of reactants and conducting of the process steps most convenient, is as follows:

1. Monoethanolamine, MEA, (USP grade) diluted with about equal weight of water is added rapidly to 37% aqueous formaldehyde solution, known commercially, as formalin, at ambient temperatures. Reactant proportions are in molar equivalents of 1 MEA to 1.3 formaldehyde (viz., 1 mole of MEA to 2.6 mole formaldehyde). A resulting exothermic reaction will automatically raise the pot temperature. This temperature rise is desirable, and the mixing rate should be maintained to keep the pot temperature between about 40°–70° C.

2. When the MEA and formaldehyde are combined, the pot temperature should be adjusted, if necessary, to 40°–42° C. Liquid hydrogen cyanide (also in 1.3 molecular equivalents) is added at such a rate that the pot temperature remains at 40°–42° C.

3. Cyanomethylation is essentially instantaneous upon contact of the reactants and, therefore, after HCN addition is completed the nitrile formation is also essentially complete.

Additional time of reaction after reactant addition may be desirable, but is not essential. However, stirring at reaction temperature for an additional period promotes necessary intimate contact of reactants.

Tests, hereinafter described more fully, have shown that a 30% to 50% excess over equation stoichiometry of formaldehyde and cyanide will give maximum yields, while simultaneously being completely consumed so that no formaldehyde or cyanide remained after nitrile formation in accordance with an essential feature of our process.

4. Following completion of the cyanomethylation in (3) above, the cyanide and formaldehyde free reaction mixture is base hydrolyzed stepwise with about 50% aqueous sodium hydroxide solution. The sodium hydroxide is also utilized in in a 30% to 50% stoichiometric excess. When addition of caustic is complete, the pot temperature is raised to reflux (about 100° C.) and heated at reflux until the evolution of ammonia ceases, (evolution of ammonia causes turbulence which is visible and also measurable, with a bubble trap, for example), to produce sodium 2-hydroxyethyliminodiacetate or HEIDA. HEIDA (sodium salt) is water soluble. Therefore, HEIDA is most easily recovered if such is desired as the acid which, by contrast, is water insoluble.

5. Accordingly, our preferred method initially treates the solution of HEIDA produced in (4) above, after cooling to ambient temperatures, with 30% aqueous hydrogen peroxide. The peroxide is not essential, but we have found that it assures a good color to the final product. Finally, concentrated hydrochloric acid, or other mineral acid, is added until a pH of about 1.5 is reached. 2-hydroxyethyliminodiacetic acid precipitates at room temperature.

EXAMPLE 1

A solution of 91.5 parts of monoethanolamine in 100 parts of water was added rapidly to 243 parts of 37% aqueous formaldehyde solution. The resulting mixture was cooled to about 40° C. and 81 parts of liquid hydrogen cyanide was added dropwise at such a rate that the pot temperature was maintained at 40°–42° C. When the addition was complete the reaction mixture was maintained at 40° C. for about 1 hour, after which time 240 parts of a 50% sodium hydroxide solution was added stepwise. The pot temperature was then raised to 100° C. (reflux) and the mixture heated under reflux until the evolution of ammonia ceased (about 1½ hours). When the evolution of ammonia had essentially ceased, the reaction mixture was cooled slightly, to about 85° C., treated with 10 parts of a 30% aqueous hydrogen peroxide solution to bleach the product, and finally acidified to about pH 1.5 with concentrated hydrochloric acid. After cooling to room temperature, the reaction mixture was filtered and the separated product washed first with water, then with methanol and finally air dried to give 171 parts of 2-hydroxyethyliminodiacetic acid, m.p. 191° C. Assay 99.4% yield 64%.

While the order in which the amine, formaldehyde and hydrogen cyanide are mixed is not critical, the Example 1 order is preferred. Examples 2 and 3 utilize alternate mixing and addition orders.

EXAMPLE 2

A 37% aqueous formaldehyde solution (243 parts) was added to a solution of 91.5 parts of monoethanolamine in 100 parts of water and the resulting mixture treated at 40° C. with 81 parts of hydrogen cyanide as in Example 1. After a 1 hour reaction time at 40° C. the mixture was base hydrolyzed and the product liberated by acidification with concentrated hydrochloric acid as in Example 1 to yield 167 parts of 2-hydroxyethyliminodiacetic acid. Assay 100%, yield 63%.

EXAMPLE 3

Two hundred forty-three parts of a 37% aqueous formaldehyde solution was treated with 81 parts of hydrogen cyanide as in Example 1. The resulting mixture was then treated with 91.5 parts monoethanolamine in 100 parts of water, while maintaining the reaction temperature at 40° C. After addition, the reaction was completed and the resulting nitrile base hydrolyzed and thereafter acidified as in Example 1. One hundred forty-four parts of 2-hydroxyethyliminodiacetic acid was isolated. Assay 99.9%, yield 54%.

The temperature at which the amine and formaldehyde are mixed is not critical and may vary, but it is preferably between 40° and 70° C. The yields obtained using the procedure described in Example 1, but in which the mixing temperature was varied, are tabulated in Table I.

TABLE I

| MEA/CH$_2$O Mixing Temperature | Yield of HEIDA |
| --- | --- |
| 15°C | 80 parts |
| 40°C | 167 do. |
| 60°C | 170 do. |
| 70°C | 171 do. |
| Reflux (about 85°C) | 50 do. |

Temperatures outside the range of Table I will result in correspondingly poorer yields.

Similarly, the reaction temperature during the second addition, e.g., the addition of the hydrogen cyanide to the monoethanolamine/formaldehyde mixture, may also vary somewhat, but is preferably kept between 38° and 42° C. This temperature has the added benefit of utilizing HCN as a liquid. The yields obtained using the Example 1 procedure, in which the cyanide addition temperature was varied, are tabulated in Table II.

TABLE II

| Hydrogen Cyanide Addition Temperature | Yield of HEIDA |
| --- | --- |
| 30° C | 147 parts |
| 40° C | 171 do. |
| 50° C | 140 do. |
| 65° C | 145 do. |

Temperatures outside the range of Table II will result in correspondingly poorer yields.

The hydrolysis of the nitrile (Equation 6) need not be limited to an alkaline reaction, even though this is the preferred route for maximum yield. The nitrile is also subject to acid hydrolysis, according to:

12. HOCH$_2$CH$_2$N(CH$_2$CN)$_2$ + 2 HCl $\longrightarrow$ 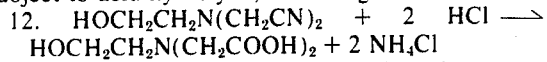
HOCH$_2$CH$_2$N(CH$_2$COOH)$_2$ + 2 NH$_4$Cl Example 4 illustrates acid hydrolysis and compares the yields obtained therefrom with that obtained in a parallel base hydrolysis.

EXAMPLE 4

A mixture of 81 parts hydrogen cyanide and 243 parts 37% formaldehyde solution was added at 60° C. to a solution of 91.5 parts monoethanolamine in 100 parts of water. After heating the reaction mixture for 1 hour at 60° C. it was divided into two equal parts by volume. One fraction was treated with 120 parts of 50% sodium hydroxide, and the product isolated by acidification as in Example 1 to yield 71 parts of HEIDA. The second fraction was treated with 125 parts of 37% hydrochloric acid and heated under reflux for 1½ hours. The pH of the mixture was then adjusted to 1.5 by addition of a small amount of aqueous caustic (NaOH) and the mixture cooled to room temperature. Filtration yielded 37.5 parts of 2-hydroxyethyliminodiacetic acid, m.p. 191° C.

It is well known that hydrogen cyanide and formaldehyde react spontaneously to form glycolonitrile:

13. $HCN + CH_2O \rightarrow HOCH_2CN$

Therefore, it is possible to carry out the process of this invention with glycolonitrile solutions replacing the cyanide and formaldehyde.

Example 5 below illustrates our process utilizing hydrogen cyanide and formaldehyde.

Example 6, immediately following Example 5, is comparable to Example 5, but substitutes glycolonitrile for the formaldehyde and cyanide of Example 5.

EXAMPLE 5

A solution of 91.5 parts of monoethanolamine in 100 parts of water was added at 60° C. to a mixture of 81 parts of hydrogen cyanide and 243 parts of 37% formaldehyde solution. After addition was complete heating was maintained for 1 hour at 60° and the mixture was then hydrolyzed as in Example 1. The product was isolated, also as in Example 1, to yield 144 parts of 2-hydroxyethyliminodiacetic acid. Assay 99.6%, yield 54%.

EXAMPLE 6

In a parallel reaction with Example 5, a solution of 171 parts of glycolonitrile in 175 parts of water was reacted as in Example 5 with a monoethanolamine solution (91.5 parts in 100 parts water) to give 120 parts of 2-hydroxyethyliminodiacetic acid. Assay 100%, yield 45%.

In the above examples, primarily because of handling convenience in the laboratory, the hydrolyzing reagent (caustic or acid) was added to the nitrile solution. It is also possible to obtain similar results by adding the nitrile solution to the caustic.

EXAMPLE 7

A solution of 2-hydroxyethyliminodiacetonitrile was prepared, as in Example 1, from 91.5 parts monoethanolamine in 100 parts water, 243 parts of 37% aqueous formaldehyde solution and 81 parts of liquid hydrogen cyanide. After the reaction of these reagents was complete, the solution was added slowly to 240 parts of 50% sodium hydroxide solution, at such a rate as to maintain a steady flow of ammonia from the reactor. When the addition was complete the mixture was heated under reflux for 1½ hours and the product isolated as before to yield 175 parts 2-hydroxyethyliminodiacetic acid, assay 99.9%, yield 68%.

Many variations are contemplated within the scope of this invention.

Adhering to the equation stoichiometry of the process of our invention:

7. $HOCH_2CH_2NH_2 + 2 CH_2O + 2 HCN \rightarrow HOCH_2CH_2N(CH_2CN)_2 + 2 H_2O$ 8. $HOCH_2CH_2N(CH_2CN)_2 + 2 MOH + 2 H_2O \rightarrow HOCH_2CH_2N(CH_2COOM)_2 + 2 NH_3$ is not essential.

The following tests, in which monoethanolamine is held constant, compare yields of HEIDA obtained with varying stoichiometric ratios of the other reactants. Data is reported in equivalents:

| Equivalents reactant/equivalent MEA | | | Yield of HEIDA based on MEA |
|---|---|---|---|
| HCN | CH$_2$O | NaOH | |
| 1 | 1 | 1 | 110 g |
| 1.1 | 1.1 | 1.1 | 112 g |
| 1.2 | 1.2 | 1.2 | 114 g |
| 1.3 | 1.3 | 1.3 | 121 g |
| 1.5 | 1.5 | 1.5 | 123 g |

It thus appears that optimum utilization of monoethanolamine occurs with a 30% to 50% stoichiometric excess of hydrogen cyanide and formaldehyde.

It is however, essential that, after reaction completion, no excess formaldehyde or cyanide remain chemically active in the reaction product mixture of nitrile.

Tests show that even with up to a 30% to 50% excess of hydrogen cyanide and formaldehyde, no such detrimental excess of formaldehyde and cyanide remains after reaction completion. A possible explanation for this seeming inconsistency might be the formation of 2-aminoethylglycolate according to:

14. $H_2NCH_2CH_2OH + NCCH_2OH + H_2O \rightarrow HOCH_2COOCH_2CH_2NH_2 + NH_3$

This reaction is probably a major factor in limiting the yield obtained. While it consumes glycolonitrile, and thus cyanide and formaldehyde, it leaves the amine group intact for the desired cyanomethylation reaction. If reaction (14) occurs, the ester group formed by equation (14) would also cyanomethylate and hydrolyze on caustic addition:

15. $HOCH_2COOCH_2CH_2NH_2 + 2 HCN + 2 CH_2O \rightarrow HOCH_2COOCH_2CH_2N(CH_2CN)_2$ 16. $HOCH_2COOCH_2CH_2N(CH_2CN)_2 + 3 NaOH + 2 H_2O \rightarrow HOCH_2CH_2N(CH_2COONa)_2 + HOCH_2COONa$ Therefore, in accordance with an essential feature of our process, while it is not necessary to follow equation stoichiometry, it is necessary to either remove or neutralize unreacted formaldehyde and cyanide after reaction completion, if such excess occurs. Unreacted formaldehyde and cyanide can generally be expected if more than a 50% excess of hydrogen cyanide or formaldehyde are employed.

The purity of the reactants is not critical, so long as the impurities do not interfere with the reaction. For example technical grade, a term commonly applied to the purity of chemicals produced on a large scale, is of satisfactory purity for the reactants of this invention.

We claim:

1. A process for the synthesis of 2-hydroxyethyliminodiacetonitrile comprising:
   reacting monoethanolamine, formaldehyde and hydrogen cyanide at from about pH 7 to about pH 9, said reaction being carried out in the absence of any alkali or alkaline earth metal hydroxide and wherein said reaction is carried out in aqueous medium, the formaldehyde and hydrogen cyanide are initially present in about 30 to 50 percent stoichiometric excess, and said reaction is carried out at a temperature of from about 40°–70° C to form 2-hydroxyethyliminodiacetonitrile.

2. A process as defined in claim 1 wherein said pH is established and maintained during the course of the reaction solely through the use of said reactants.

3. A process as defined in claim 1 in which said reaction is carried out at a pH of about 8.

4. A process as defined in claim 1 in which said reaction is carried out by mixing the monoethanolamine and formaldehyde together to form a first mixture and mixing this first mixture with hydrogen cyanide to form a second mixture.

5. The process as defined in claim 1 in which the formaldehyde and hydrogen cyanide are utilized as glycolonitrile.

6. A process as defined in claim 4 in which the temperature at which said first mixture is formed is about 40°–70° C.

7. A process as defined in claim 4 in which the temperature at which said first mixture is formed is about 15°–85° C.

8. A process for the synthesis of 2-hydroxyethyliminodiacetonitrile comprising: reacting monoethanolamine, formaldehyde and hydrogen cyanide at from about pH 7 to about pH 9, said reaction is carried out in aqueous medium, the formaldehyde and hydrogen cyanide are initially present in about a 30 to 50 percent stoichiometric excess, and said reaction is carried out by mixing the monoethanolamine and formaldehyde at a temperature of about 40°–70° C. to form a first mixture and mixing this first mixture with hydrogen cyanide at a temperature of about 38°–42° C. to form 2-hydroxyethyliminodiacetonitrile, said reaction being carried out in the absence of any alkali or alkaline earth metal hydroxide.

9. A process for the synthesis of 2-hydroxyethyliminodiacetonitrile comprising: reacting monoethanolamine, formaldehyde and hydrogen cyanide at from about pH 7 to about pH 9, said reaction is carried out in aqueous medium, and said reaction is carried out by mixing the monoethanolamine and formaldehyde at a temperature of about 15°–85° C and mixing this first mixture with hydrogen cyanide at a temperature of about 30° – 65° C to form 2-hydroxyethylaminodiacetonitrile, said reaction being carried out in the absence of any alkali or alkaline earth metal hydroxide.

10. A process as defined in claim 9 wherein the formaldehyde and hydrogen cyanide are initially present in about 30 to 50 percent stoichiometric excess.

* * * * *